Dec. 24, 1968   J. H. LEMELSON   3,417,681
APPARATUS FOR TRANSDUCING AND RECORDING INFORMATION
Filed May 27, 1966   4 Sheets-Sheet 1

INVENTOR.
JEROME H. LEMELSON
BY

Dec. 24, 1968   J. H. LEMELSON   3,417,681
APPARATUS FOR TRANSDUCING AND RECORDING INFORMATION
Filed May 27, 1966   4 Sheets-Sheet 2

INVENTOR.
JEROME H. LEMELSON
BY

Dec. 24, 1968    J. H. LEMELSON    3,417,681
APPARATUS FOR TRANSDUCING AND RECORDING INFORMATION
Filed May 27, 1966    4 Sheets-Sheet 3

INVENTOR.
JEROME H. LEMELSON
BY

Dec. 24, 1968  J. H. LEMELSON  3,417,681
APPARATUS FOR TRANSDUCING AND RECORDING INFORMATION
Filed May 27, 1966  4 Sheets-Sheet 4

INVENTOR.
JEROME H. LEMELSON
BY

United States Patent Office 3,417,681
Patented Dec. 24, 1968

3,417,681
APPARATUS FOR TRANSDUCING AND
RECORDING INFORMATION
Jerome H. Lemelson, 85 Rector St.,
Metuchen, N.J. 08840
Continuation-in-part of application Ser. No. 297,719,
July 25, 1963. This application May 27, 1966, Ser.
No. 553,396
7 Claims. (Cl. 95—1.1)

ABSTRACT OF THE DISCLOSURE

The disclosure broadly teaches recording apparatus for providing an original and a duplicate copy of a business or other similar type transaction, including a housing having means for receiving a card from a card holder, said card being of the credit card type and having indicia identifying the particular holder. The housing is provided with a recording member, at least one portion of the surface thereof being photosensitive to record images. Manually settable means are provided for setting in variable type information such as the particular goods or services being purchased and the value thereof. Further means are provided for developing the images upon the recording member and for dispensing one receipt of the transaction while retaining at least one other receipt of the transaction within the housing.

---

This invention relates to apparatus for transducing and recording information and is a continuation-in-part of my copending application Ser. No. 297,719, entitled Document Producing Means, and filed on July 25, 1963 now U.S. Patent No. 3,267,843 issued Aug. 23, 1966.

In various commercial transactions it is frequently required to record or enter as part of a record information, at least part of which may be considered fixed or repetitive in nature and at least part of which is variable from transaction to transaction. For example, in recording a purchase or sale, the name, address and other information regarding the purchaser may be considered fixed information. Other information regarding the article purchased, catalog number, price and the like would be considered variable. It is frequently desired to enter a transaction containing said fixed and variable information directly onto a recording member such as a paper or magnetic tape, cards or other handy forms which may be automatically fed through a reading mechanism for entry into a computer. Heretofore, documents such as transactions involving credit-card impression printing, have required the hand entry of variable information. Furthermore the fixed information derived by impressing the credit card, is frequently provided illegible due to failure of the operator to obtain a suitable impression. This invention is primarily concerned with the transducing of such information and apparatus as well as pre-recorded devices for simplifying the entry of such information onto a recording member.

It is accordingly a primary object of this invention to provide a new and improved apparatus applicable for providing information on a recording member which information may be easily and automatically transduced to said recording member for computing and record-keeping purposes.

Another object is to provide an improved system for record keeping including a plurality of pre-recorded cards or the like, which system includes information entry devices adapted to receive one or more of said cards and to scan and record information therefrom and to further record variable information derived by manually programming said apparatus.

Another object is to provide a simple device for receiving a card containing pre-recorded information and for transducing said pre-recorded information onto a recording member while simultaneously recording further information which is enterable into said device by manually adjusting said device.

Another object is to provide a system for recording transactions which utilizes pre-recorded cards such as so-called credit cards and includes means for recording information from a card by rapid, accurate and trouble-free photographic means without the need for making handwritten entries.

Another object is to provide a simple electromechanical device for photooptically recording business transactions which device also dispenses a receipt.

With the above and such other objects in view as may hereafter more fully appear, the invention consists of the novel constructions, combinations and arrangements of parts as will be more fully described and illustrated in the accompanying drawings, but it is to be understood that changes, variations and modifications may be resorted to which fall within the scope of the invention as claimed.

These and other objects of the instant invention will become apparent when reading the accompanying description and drawings in which.

Figure 3:
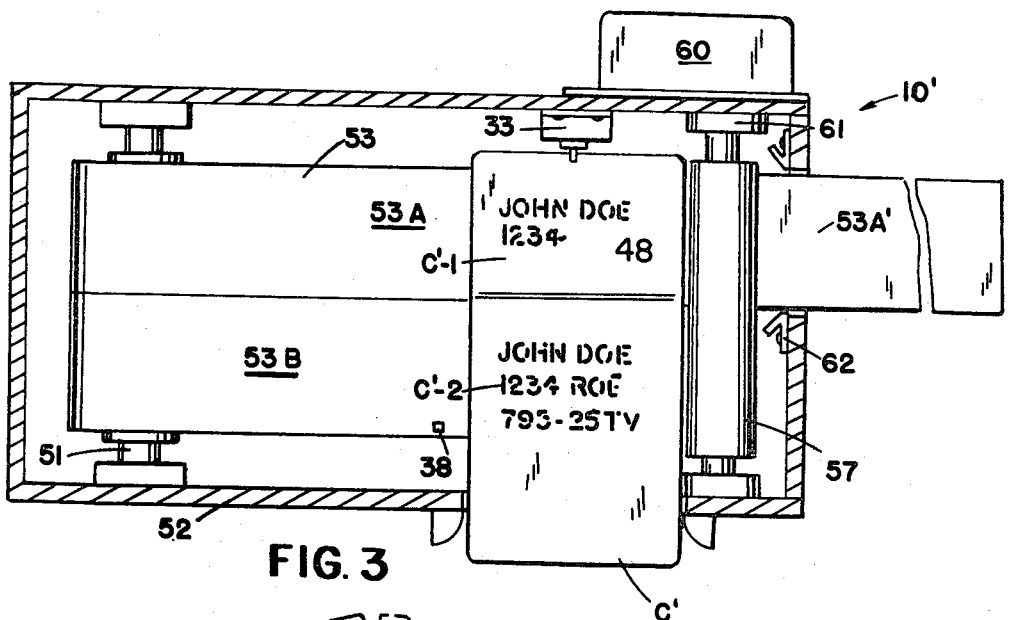
FIGS. 3 and 4 are top and side views of an alternative embodiment to that shown in FIGS. 1 and 2.
Figure 4:
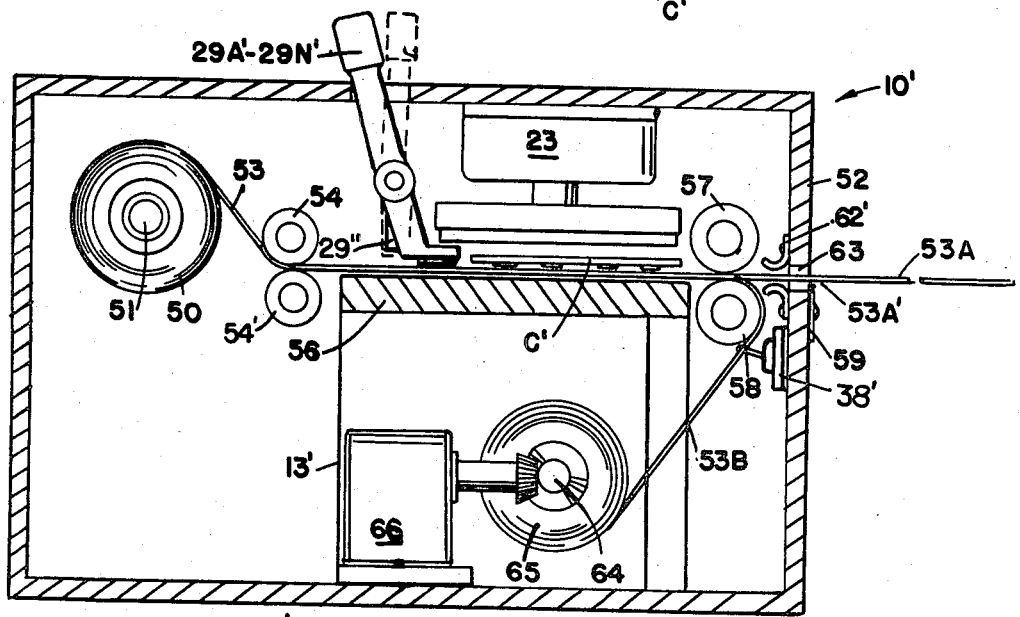
Figure 4:
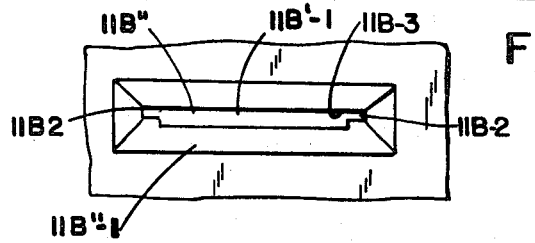

FIG. 4' is a detailed view of the credit card receiving means for the recording mechanism of FIGS. 3 and 4.

Figure 5:
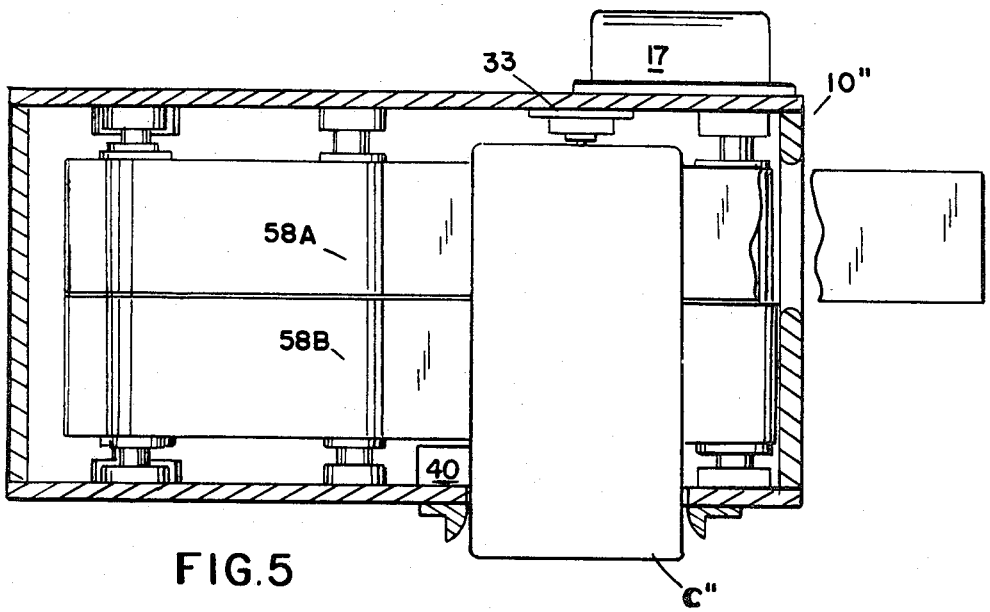
Figure 6:
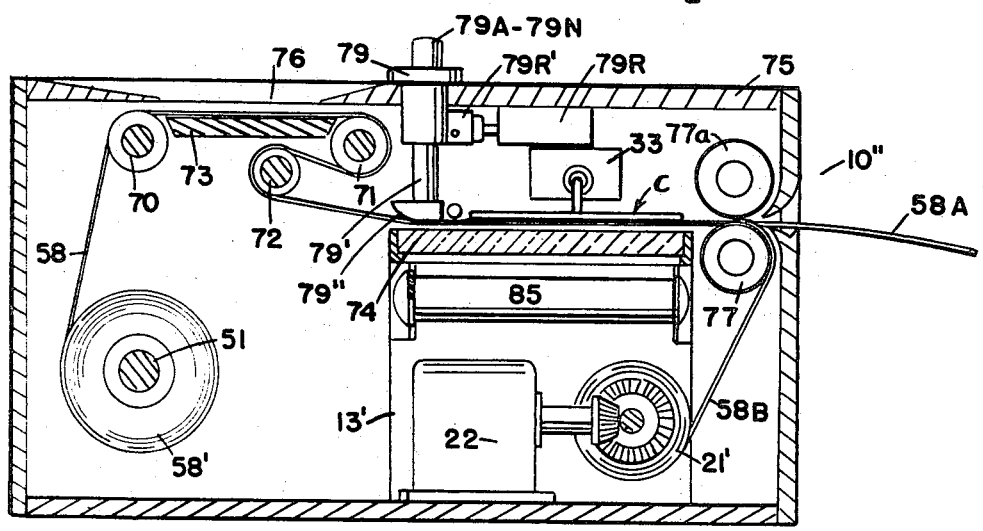

FIGS. 5 and 6 are top and side plan views of still another embodiment of the device of FIGS. 1 through 4.

Figure 7:
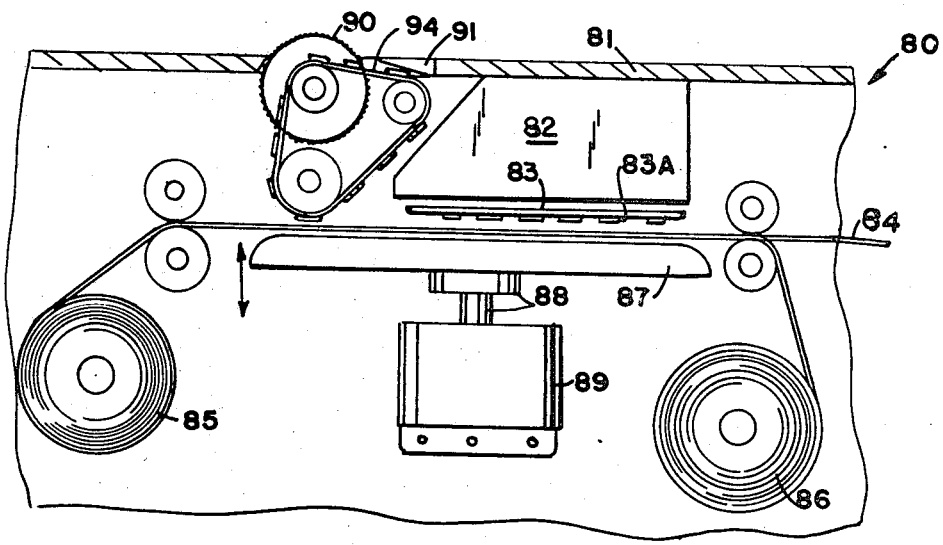
Figure 7A:
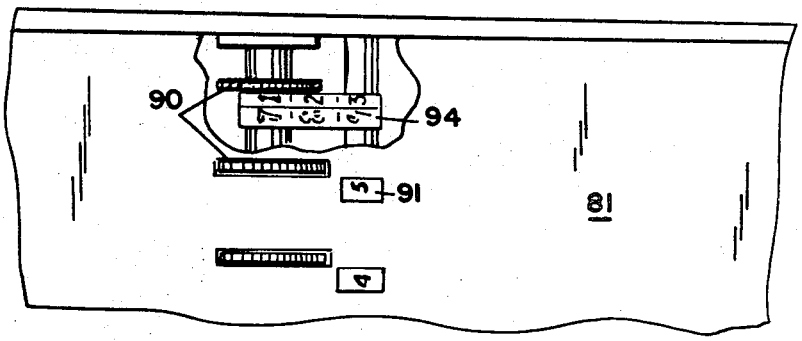

FIGS. 7 and 7a are top and side views respectively of another preferred embodiment of the instant invention.

Figure 8:
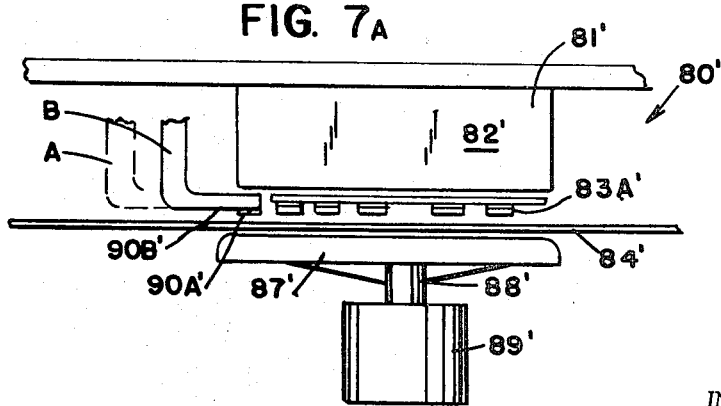

FIG. 8 shows still another embodiment of the instant invention.

Broadly, this invention relates to an accounting system which is applicable for the conduction of various business transactions without the need for the attendance or supervision of a clerk on the part of a vendor. More specifically, the invention is preferably, although not necessarily, applicable to transactions which do not involve the transfer of material goods. Such transactions as the purchase of insurance such as travel insurance or the like may be easily and quickly accomplished by means of devices provided herein which devices also permit the rapid and automatic entry of information relative to the transactions into a computer or recording device and the accomplishment of automatic billing without the need for human attendance.

The conventional method of dispensing short term insurance policies such as travel insurance by means of a machine generally requires that the purchaser enter most if not all information by means of a writing implement. This function is extremely time-consuming and tedious. As a result, many would-be sales are not consummated.

In a preferred form of this invention, subscribers to the system are provided with a card on which is recorded fixed information regarding the subscriber and a plurality of machines are provided which are easily programmable by manual means by a subscriber to enter variable information and, in certain instances the machines are also self-programmed for the entry of information such as date, time, etc. Fixed information regarding the subscriber is derived from the subscriber's card by means of prepositioning the card in the machine prior to activating the machine to effect a transaction. Other necessary variable information is derived, in a preferred form of the invention, when the subscriber programs the machine by means of depressing keys or bi-stable push buttons. Deactivating or disabling means are also provided so that if complete information is not programmed or otherwise enterable an entry may not be made.

Figure 1:
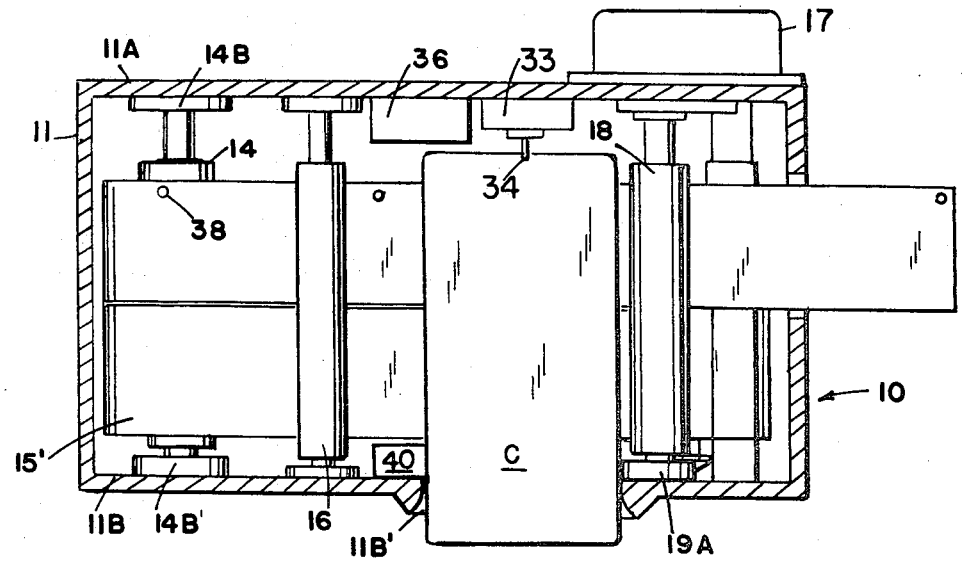
FIG. 1 is a top view of a recording mechanism designed in accordance with the principles of the instant invention and showing the cover removed to display its contents.
Figure 2:
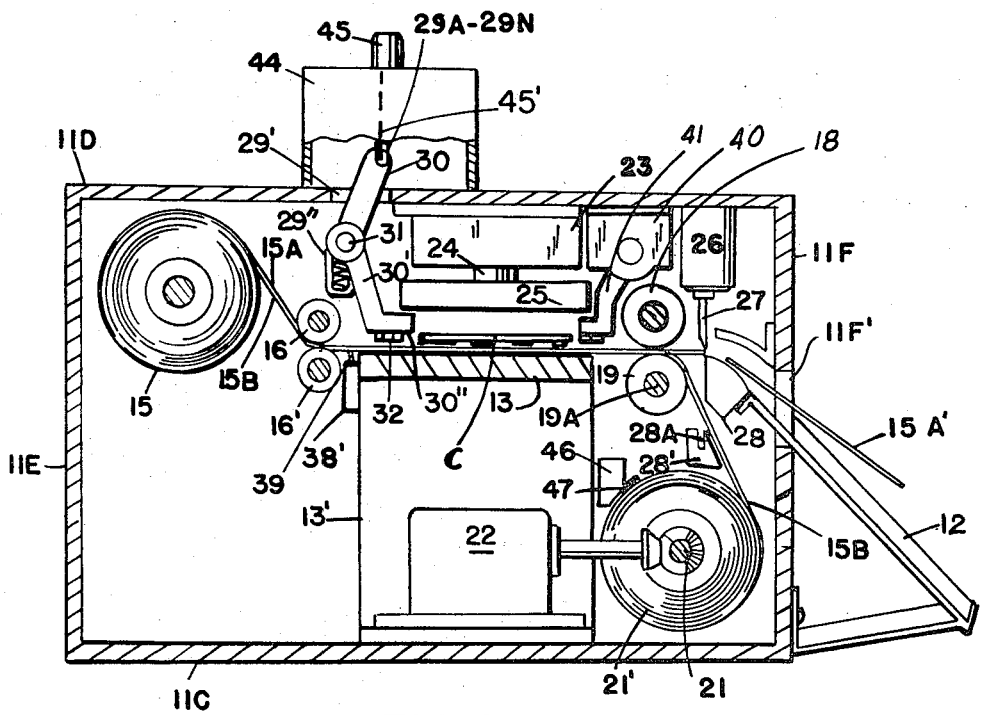
FIG. 2 is a side view of the recording mechanism of FIG. 1 showing the recording mechanism with one side plate thereof having been removed.

FIGS. 1 and 2 illustrate one embodiment of a record making and receipt dispensing device 10 for preparing documents to record transactions such as insurance, orders and the like. The apparatus 10 comprises a rectangular housing 11 having sidewalls 11A, 11B, a bottom wall 11C, top wall 11D, and end walls 11E and 11F. The sidewalls support a plurality of elements of the recording device including the bearings 14B and 14B′ in which is journalled a shaft or drum 14 adapted to rotate therein and further to support a roll 15 of recording material 15′ such as a paper tape means which consist of at least two sheets 15A and 15B with the top sheet 15A having suitable copying material such as duplication carbon or alternatively with said sheets of materials being designed such that an impression from the raised letters of the credit card when applied with sufficient force on the top sheet 15A may be visually or otherwise indicated or impressed upon the bottom sheet 15B. Certain ink or printing material filled papers such as are used for receipt copies of the American Express Credit System may also be provided for both sheets 15A and 15B.

The multiple layer sheet 15′ is guided between free wheeling rollers or bars 16, 16′ and then over a backing plate 13 which is supported above bottom 11C of the housing. The double or multiple layer sheet 15′ passes beyond the backing plate 13 and is sandwiched between driving rollers 18 and 19 which are supported on suitable shafts 18A and 19A for pivotal movement in the sidewalls 11A and 11B of the housing. Roller 18 frictionally engages the top of multiple layer sheet 15′ and is power operated by a motor means 17 to rotate shaft 19A and thence roller 19 which, in cooperation with the pressure roller 18 engages the bottom face of multiple layer sheet means 15′.

Individual sheets 15A and 15B separate beyond rollers 18 and 19 with the upper sheet 15A passing above a second backing plate or bar 28 which cooperates with a servo operated shear blade 27 to sever a predetermined portion 15A′ of sheet 15A from the remainder of multiple layer sheet 15′ such that the severed portion 15A′ passes through a suitable opening 11F′ in end wall 11F enabling the severed sheet to fall onto a chute or receiving bin 12 thereby making available the severed portion for use as a receipt by the subscriber utilizing the recording mechanism.

The sheet 15B is guided beneath backing member 28 and is wound upon a driven take-up roller 21 powered by motor means 22 so as to gather the continuous sheet 15B into a roll 21′ of stored paper which is retained within the housing for use in subsequent billing or other accounting operations.

In the operation of the device 10 shown in FIGS. 1 and 2 a card such as a so-called credit card C is inserted into an opening 11B′ provided in side wall 11B and is therefore guided by guide portions 11B″ (see FIG. 4′) of the wall 11B and within housing 11 as it is manually inserted so that it is positioned just above the composite sheet 15′ and is placed in alignment with a pressing platen or bar 25 which is secured to the lower end of a shaft 24 connecting the platen 25 to a lineal servo driving means 23 such as, for example, a solenoid. A limit switch 33 is secured within the housing in a position whereby its actuator arm or projection 34 will be moved inwardly towards the switch 33 by the adjacent edge of credit card C so as to close the switch which thereby initiates an operating cycle which first energizes a multi-circuit self-resetting timer 36 connected to limit switch 33 which timer effects the following functions:

Solenoid 23 is first energized causing platen 25 to engage the upper surface of card C which has its raised or embossed face (not shown) facing in the downward vertical direction. The embossed face of the card is pressed by the platen ram 25 against the multiple sheet means 15′ with sufficient force to cause an imprint or visible impression to be made on both sheets 15A and 15B simultaneously. After solenoid 23 retracts (i.e., it is de-energized) drive motors 17 and 22 are energized by multi-circuit timer 36 for a sufficient time period so that motor 17 moves sheet 15A through a distance of one form length such that the trailing edge of the completed form or receipt is immediately in position beneath the shear blade 27 while the leading edge of the next transaction form is immediately adjacent shear blade 27. Upon de-energization of motor means 17, solenoid 26 is then operated by cycle timer 36 causing shear blade 27 to sever portion 15A′ of document 15A, the front end of the severed portion having already passed partially through opening 11F′ such that upon completion of the severing action the transaction form 15A′ falls by gravity into the dispensing bin 12. Shear means 27 may be replaced by simply substituting a frictional surface for momentarily holding sheet 15A at the point of shear blade 27 adjacent to a perforated line along the receipt so that the receipt portion 15A′ may be simply torn off along the perforated edge by the subscriber using the machine. As a second alternative, shear means 27 may be completely removed and substituted simply by providing perforations between the trailing edge of the completed receipt and the leading edge of the next receipt to be prepared by the recording mechanism.

Since it is usually required to enter variable information on both copies of the transaction documents such as, for example, the amount of insurance, the product order code, etc., a means for selectively effecting such an entry is provided in the form of a plurality of push button assemblies 29A through 29N each of which is connected to a linkage mechanism (not shown) for positioning, when the respective push button is depressed, a numeral or letter die or cut such as the die 32 in the path of the movable platen 25 so that an imprint of said variable information is made adjacent the imprint provided by the card C upon the sheets 15A and 15B. Each push button assembly 29A through 29N is guided by an elongated sliding-bearing or slot means 29′ provided in top wall 11D and has its associated angular arm 30 pivotally supported by walls 11A and 11B. Each button projects downward and vertically upward from the top wall of the housing 44. Each push button assembly is a bi-stable device pivotable either in the clockwise or counterclockwise direction about its pivot pin 31 which pin is journalled in the elongated slots 29″ provided in side walls 11A and 11B (only one of said slots being shown in FIG. 2). Each push button, when depressed, pivots the angular arm 30 counterclockwise about pivot 31 through a linkage so as to swing the lower portion 30′ thereof, which contains the printing cut 32, so that its lower extremity 30″ moves from a retracted position toward a position which is in close proximity with the left hand end of platen ram 25. The pivot pin is biased by bias means or spring means 29″ so that it is urged vertically upward; however, when solenoid 23 is energized, plate 25 moves in the downward vertical direction catching and urging the surface 30″ downward against the force of the biasing spring 29″ so that the cut 32 is impressed upon the surface of multi-layers 15A and 15B together with the impression of the embossing upon credit card C. The elongated slots 29″ are sufficient to permit arms 30′ to move to a sufficient distance in order to provide a suitable impression upon the multi-layer sheet means 15′. The extreme lower portion 30" on which cut 32 is secured may also be spring mounted relative to arm 30 or may be free floating to permit cut 32 to move vertically and to be impressed against the upper surface of sheet means 15' in alignment with the backing plate 25. The point at which the cut or die 32 engages the upper surface of sheet means 15' is to one side of the area which receives the impression from card C. It should be noted that arms 30 which are not rotated in the counterclockwise direction from the position shown in FIG. 1 while they may be moved in the downward vertical direction due to the movement of pin 31 will not be impressed against the document 15' since they will not be caught by the lower left hand edge of the movable platen 25. Thus by selectively retracting and advancing the push buttons 29A to 29N certain of the dies come into alignment with the movable platen 25 to provide a code or alpha-numeric imprint indicative of a selected notation, which imprint may be provided adjacent the imprint of both sheets made by the master or embossed portions of the card C when compressed by the plate against the composite sheet means 15'. To facilitate selection of the information to be entered by means of operating the push buttons, the visually observable symbol or imprint may be provided upon the surface of or adjacent each push button and instructions may also be provided on the upper surface of the top lid of the housing 11 to further describe the operation of the recording mechanism. One embodiment of the push button arrangement may be comprised of the projecting housing portion 44 having a plurality of push buttons such as, for example, a push button 45, the number of push buttons being equal in number to the number of levers 29A through 29N. The push buttons are then mechanically linked as shown by the dashed line 45' showing such linkage in schematic fashion to select certain combinations of levers 30 for actuation to the counterclockwise position or to enter the desired variable information. The selection of the different push buttons would of necessity cause the actuation of a different combination of certain levers 30.

Since the degree of operation of the motor 22 to rotate the take-up roll 21 will decrease as the take-up roll of paper 21 increases in diameter as more paper is fed thereto, motor means 22 is preferably adapted with a suitable electronic control 46 having an arm 47 which bears upon the surface of roll 21'. As the radius of 21' increases, arm 47 rotates in the counterclockwise direction causing the device 48 to alter the period in which motor means 22 is energized so as to actuate or rotate the take-up roll 21'. As a secondary arrangement the control means 46 may cause stoppage of motor means 20 as tension increases on the web of paper wound on shaft 21.

Motor control means 47 may be eliminated by providing a suitable control means for motor 22 which steps the motor when the trailing edge of the transaction form is positioned beneath the blade member 27. Such control may be effected by providing holes or apertures 38 in the multi-layer web 15' such as is shown in FIG. 3 of the drawings. The apertures are placed at spaced intervals which define the leading edges of said forms and are arranged to override limit switch 38' as shown in FIG. 1 with its actuator arm 39 adapted to bear against work means and to become actuated so as to move through the aperture 38 and to control certain movements being employed to operate the solenoid 27 thus effecting cut-off of the desired section 15A' of the sheet 15A, and further to provide de-energization of the motor 22 to control the take-up of the paper roll 21'.

In still another form of the invention the take-up or storage reel 21' may be completely eliminated by severing also portions of the sheet 15B and storing them in a stack within the housing wall with severed portions of 15A or dispensed upon the outside bin or tray 12. One means of severing a portion of the sheet 15B is by providing member 28' having a suitable slot 28A for receipt in a portion of said slot of the tripper shears 27 by an amount sufficient so as to sever sheet 15A as well as sheet 15B. A suitable bin (not shown) is further provided for the purpose of collecting all receipts to be retained internally within the recording mechanism.

Depending upon the application to which the printing device 10 is used, certain problems involved in its use may arise such as times when the user or operator may attempt to arise, such as an operator's attempt to the raised or embossed surface of the card facing in the upward vertical direction as opposed to the correct position which is with the embossed portion facing in the downward vertical direction. Since movement of the reciprocating platen 25 against the raised letters of the card may buckle or otherwise damage said letters and further since it will not result in the creation of a suitable impression upon the sheets 15A and 15B, an arrangement such as that shown in FIG. 4' is provided to prevent the operation of the solenoid 23 if the card C is inserted with the raised code or letters facing upward. The arrangement of FIG. 4' is such that the slot 11B" is shaped so that it will only permit passage of the card C therethrough when the raised or letter portions of the cards are facing downward. The length of the slot 11B" is provided with a central portion 11B-1 at the bottom marginal edge of the slot which portion has a thickness, together with the upper portion, which is sufficient to permit the embossed letters of the card to pass therethrough when the card C is facing downward. The remaining end portions 11B-2 of the slot are a few thousandths of an inch greater in width than the thickness of the card C in the portion where the card is not raised or embossed. The length of the slot is approximately 1/16 of an inch greater than the width of the card. The card is intended to be inserted with the raised portion facing upward so that the raised portion or letters will engage the upper edge 11B-3 of the slot to prevent passage of the card. The notation 11B"-1 refers to a bevel or sloping guard for the card which protrudes from the slot and provides means for facilitating insertion of the card C. The raised portion or letters essentially provided on the card C are positioned so that it will make little difference as to which longitudinal edge of the card is inserted into the slot first. However, by printing a suitable arrow as shown at 48 in FIG. 3 on the card C, a visual indication is provided of which the longitudinal edge of the card is to be inserted into the slot and will further facilitate automatic reading of the characters imprinted on the sheets 15A and 15B.

As an alternative embodiment to that shown in FIGS. 1 and 2 of the drawings, FIGS. 3 and 4 show a recording mechanism 10' provided with a supply roll 50 mounted upon a suitable shaft 51 which is suitably journalled in the sidewalls of the housing 52. The paper tape or document 53 passes between the rollers 54, 54' in the same manner as previously described and upon the backup plate 56 and subsequent thereto between rollers 57, 58 which operate in a manner similar to the rollers 18 and 19 previously described with respect to FIGS. 1 and 2. Basic differences in the embodiment of FIGS. 3 and 4 are that the roll 50 of paper 53 is comprised of two separate sheets 53A and 53B both of which are fed simultaneously and both of which pass above the back-up platen 56. The credit card C' employed in the embodiment of FIGURES 3 and 4 is provided with two embossed areas C'-1 and C'-2 being the exact duplicate of the other for the purpose of impressing this information upon both sheet 53A and 53B. Both tapes 53A and 53B are driven by drive roll 51 which is connected by shaft means 61 to a drive servo 60. The first paper tape 53A is arranged so that it passes through an opening 63 in the sidewall of housing 52 so as to provide a receipt form such as a receipt form 52A" which may be torn off along its trailing edge 53A' by the subscriber in order to be retained by the subscriber for his own purposes. The second paper strip 53B passes between drive roll 57 and lower roller 58 and is wound up by the spool 64 actuated by a take-up roll servo 66 to form the accumulating paper roll 65 thereon.

The operation of the embodiment of FIGS. 3 and 4 is basically the same as that of FIGS. 1 and 2 wherein the limit switch 33 initiates the cycle operation of the solenoid and drive mechanism within the housing upon suitable insertion of card C'. One basic difference, however, is that each of the lever arms 29A–29N' is provided with two dies or cuts at its lower end for the purpose of making a suitable imprint upon both the dispensed paper strip 58A as well as the stored paper strip or tape 53B.

Embodiment 10" of FIGS. 5 and 6 is substantially similar to that shown in FIGS. 3 and 4 except that the supply roll 58' of dispensed paper strips 58A and 58B passes over a first roller 70, second roller 71 and a third roller 72, which arrangement is provided so that paper 58 may pass above a stationary platen 73 which is positioned immediately beneath the top surface of the housing 75 which is provided with a suitable opening 22 so as to permit the user of the machine to make written notations upon the surfaces of the strips 58A and 58B. The strips 58A and 58B then pass over a backing platen 74 which in this embodiment is a glass, plastic, rubber or other suitable transparent plate. An ultraviolet light source 85 is positioned immediately adjacent and beneath plate 74. Keys 79A to 79N are operative when selectively depressed to advance respective shafts 79' of each key mechanism downward. Secured to the end of each shaft 79' is a small plug 79" the bottom face of which contains indicia such as alpha-numeric (i.e. alphabetic or numeric) characters on a white background. When said bottom face of member 79" is urged into abutment with the upper face of ultraviolet sensitive sheeting 58, ultraviolet light from source 85 is operative to expose sheet 58 with the alpha-numeric character on 79" developable as an image therein. Each key mechanism 79 is bi-stable in operation, that is, the keys remain depressed with the plugs 79" depressed against the upper face of the recording paper 58 unless each key is again pushed by hand which releases shaft 79' to move upward. Notation 79R refers to a solenoid or servo operated device the output shaft of which is coupled to a reset mechanism 79R' connected to all key mechanisms 79 for automatically resetting all keys in response to the operation of the cycle timer 36 (not shown).

The ultraviolet light source 85 is energized in order to expose a length of each of the sensitized paper strips 58A and 58B for the desired recording images. The sensitized paper may be of any suitable light-sensitive, heat developable type such as reproduction paper sold under the trademarke name Thermo-Fax manufactured by the Minnesota Manufacturing Company of St. Paul, Minn. The sensitized paper which has been appropriately exposed, then passes between drive rollers 77a and 77 to be dispensed in a manner similar to that described in FIGS. 3 and 4. Roller 77, however, is provided with a suitable heating means such as electrical resistance heater wires or the like, embedded therein which are operative to that when said rollers are being rotated heat developable images are generated in the two strips 14a and 14b. The Thermo-Fax recording arrangement may further be substituted by suitable electrostatically operative recording means such as xerography or photographic means to photograph the information presented on the credit card C as well as the variable information provided at the ends of the selected and depressed keys of the key bank 79 arranged as a row or rows across the top wall 75A of housing 75.

As previously described, in order to provide additional variable information such as the date and time of the transaction, suitable clock means such as, for example, the clock 40 shown in FIG. 1, is provided in the recording mechanism having reciprocating key members 41, only one of which is shown in FIG. 1, which keys are continuously changing in their positions relative to movable platen 25 as the time and date continually changes in order to provide a suitable indication of date and time of transaction when such information is desirable to comlete the transaction. Rotating clock driven printing wheels may also be used to effect a numerical printed indication of time, date, etc., and the frame of rotationally supporting such wheels may be engaged by the platen 25 to cause the lowermost portions of the wheels to be impressed against the paper strip, photographed or otherwise reproduced.

FIGS. 7 and 7A show another dispensing means 80 whose top-surface 81 has a backing plate 82' positioned therebeneath. The card 83 when properly positioned lies immediately beneath backing plate 82' with the raised lettering 83A projecting vertically downward. The record paper 84 is dispensed from spool 85 and extends to take-up spool 86 which receives the carbon copy while the original copy 84A is dispsensed to the exterior of the machine in the same manner as previously described.

A platen ram 87 is positioned beneath record paper 84 and is attached to armature 88 actuated by solenoid 89. The top surface 81 is provided with a plurality of rotatable code wheels for setting up the variable data positioned at 93. A plurality of windows 91 are associated with the code wheels 90 beneath which are positioned movable tapes 94 actuated by the rotatable code wheels 90. Tapes 94 are provided with lettering to indicate the type faces which are positioned adjacent record medium 84. When solenoid 89 is actuated both the type faces 93 and the raised portion 83A of card 83 are simultaneously printed upon or otherwise recorded by record medium 84.

FIG. 8 shows still another dispensing means 80' which employs a plurality of Z-shaped keys 90' pivotally supported within housing 81' and movable from position A to position B so that the lower edges 90A' of keys 90' are positioned above record medium 84'. Edge 90B', of key 90' rests against the lower edge of medium 84'. Edge 90B' of key 90' rests against the lower edge of backing plate 82' so that when platen ram 87' moves vertically upward both the type on the lower surface 90A' and the raised lettering on card 83A' are recorded upon record medium 84'.

In the embodiments illustrated in FIGS. 1–8, the slotted hole 11B' for receiving the card C is shown disposed horizontally in the side wall 11B of the housing. Other arrangements may, including disposing the slotted hole in the top wall 11D so that the card will drop by gravity through part of the housing adjacent a section of the recording member or tape which is guided substantially vertical. A vertically extending slotted hole in the side wall may also be utilized and the guide means for the card which is exterior of the housing may comprise a sheet metal trough extending a substantially greater degree than 11B" beyond the side wall to receive and guide the card through the housing.

Means, such as a photoelectric detector, may be utilized in place of the limit switch 33 to detect the card.

Certain possible variations in the illustrated apparatus are noted as follows:

In the embodiments of FIGS. 1–4 it has been noted that separate sheets of print impressing paper such as carbon paper may be employed between the inserted card and the record member, or carbon black may be coated on a face of one sheet abutting a second sheet, or printing material such as carbon may be incorporated or on the surface of the record member coated so as to provide a visible marking when impressed, a stationery or movable inking means may be disposed between the card and the record member in the housing. For example, carbon ribbon may be provided on a transport and movable within the housing to form an imprint on the record member when impressed with the card thereagainst and against the record member or members. The transport for the ribbon may be geared to the means driving the paper tape but operated to move a short distance with each movement of the record paper. Since the average carbon ribbon is usable for multiple impressions, suitable imprints from substantially the same portion of a ribbon may be obtained.

In the embodiment of FIGS. 5 and 6, it may be desirable, in certain instances, to provide servo driven means for urging the paper into abutment with the inserted card and the depressed keys 79. This may be accomplished by the ram means provided in FIGS. 1 to 4 operative to engage either the card or record paper and urge it against the other. For example, the transparent plate 74 per se or together with the light source 85 may be movably mounted and connected to a solenoid operative to engage the bottom face of the paper 58 against the face of the inserted card C upon activation of switch 33. In such an embodiment, a backing plate of the type described which is supported by the side walls of the housing would be provided above the card to restrain its upward movement in a manner similar to that shown in FIG. 7.

In still another embodiment, the inserted card may be automatically photographed upon full insertion into the housing by a camera device replacing, for example, the photo-printing means of FIGS. 5 and 6 which camera device may also be operative to photograph the person using the recording apparatus. Such embodiment may employ a double-optical system using two lens arrangements to expose a single or double strips of photosensitive film either or both of which may be developed within the housing wherein one may be dispensed and the other retained for future reference by the owner of the machine. One lens system may be directed downwardly within the housing to photograph the inserted card C", while a lens-automatic shutter system scans through an opening in the top wall such as wall 75 of FIG. 6 and so directly as to photograph a person who is inserting the card into the machine. Instructing may be provided on the housing or adjacent thereto directing the person inserting the card to look into the aperture in the top end or side wall of the housing in order to effect a suitable transaction. A suitable lens system may also be provided to expose a portion of the photo-sensitive heat developable material 58 of FIGS. 5 and 6 so as to record the image of the head of the person effecting the transaction on a selected portion of the material 58 which is retained within the machine and utilized for identification purposes. The image of the head of the person using the device may also be recorded on a portion of the photo-sensitive paper 58 and developed therein by the illustrated heating means or other suitable means prior to dispensing a length of the paper containing the photograph for retention by the user. In other words, the device illustrated in FIGS. 5 and 6 may be so modified as to be utilizable for transactions and/or as a means for providing a low cost photograph of a person using same on a length of photo-sensitive paper or plastic which is fed from a roll or coiled supply 58 thereof and/or from a stack of individual sheets of same when the controller of the apparatus is actuated as described. A record of the transaction may be effected as described by insertion of a suitable card having information relating to the user of the apparatus which is recorded for billing or record keeping purposes or the machine may be coin-operated wherein insertion of a suitable coin into a slot may be utilized to energize a switch such as 33 to effect the resulting photographing, fixing and sheet movement operations described for dispensing a predetermined length of the sheet material containing the described personal photograph. The lens system for exposing the leading portion of the sheet material to the light obtained from the image of the person using the device may be supported by the top wall 75 and/or one or more of the side or end walls of the housing. A suitable light source may also be supported by the housing, directed against the subject being photographed and connected to a source of electrical energy immediately upon or shortly after closure of switch 33 either through said switch or under the control of the described multi-circuit timer. The same or separate light source may also be used to illuminate the surface of the card in response to actuation of the switch 33. If a line light source is utilized which extends beneath platen 74 of FIG. 3 laterally across the sheet or sheets 58 of photosensitive paper, the light source may be automatically driven along the length of paper adjacent the card C and indicia 79" so as to expose the desired full length thereof to the desired image(s). If a camera type lens-shutter system is employed to photograph or direct the image of the person being photographed against the recording member 58, a solenoid controlled by said multi-circuit timer may be employed to operate said shutter.

In another embodiment the inserted card may be driven through or into and out of the housing between rollers or on a closed-loop conveyor belt and is engaged within the housing by a ram of the type described against the record paper to provide an impression thereon. A further variation in the apparatus of FIGS. 5 and 6 may include means for receiving and driving the card through the rollers in the housing one of which rollers may contain the ultraviolet light source to effect exposure of the sensitive paper 58 to the card images after which the paper is heated, as described, to develop the images therein.

It is seen from the description of the foregoing embodiments, the instant apparatus provides a recording mechanism which simultaneously provides both a stored document and a dispensed document setting forth all details of a transaction. The operation of said mechanism being simple, straightforward and relatively fast in the performance thereon and which further is designed to be readily adapted for use in billing and for analysis by accounting computers.

While the foregoing description has set forth specific embodiments it provides for the purpose of carrying out the principles of the instant invention, various other embodiments and modifications will become obvious and it is desired that the scope of the instant invention should be limited only to the extent of the limitations of the claims set forth below.

I claim:
1. A business machine comprising in combination with a credit card member containing duplicte first information to be transferred to a recording member;
   information transfer means including a housing;
   means for releasably receiving said credit card member and for positioning said credit card member within said housing;
   a record medium comprising first and second recording members each having at least a portion thereof which is light-sensitive;
   means mounted within said housing for simultaneously exposing both members of said record medium to said first information derived from said credit card member and further image producing means supported by said housing including means for simultaneously recording on both record members of said record medium a plurality of separate character images;
   means for selectively positioning selected ones of said separate character images for simultaneous recording on both of said recording members;
   means for subsequently developing the exposed images in the area of said first and second record members exposed thereto;
   means for dispensing the exposed portion of said first recording member and means for retaining the exposed portion of said second recording member;

both said first and second exposed recording members containing the same information.

2. A business machine in accordance with claim 1, said means for recording a plurality of separate character images including a plurality of indicia each of which is selectively positionable with respect to said first and second recording members for selectively recording thereon.

3. A business machine in accordance with claim 2 in which said indicia are capable of being selectively positionable with respect to said recording and second recording members for effecting selected recording in the form of a line of indicia therein, and means for generating light and passing same through those indicia which are selectively positioned with respect to said recording member for recording the selected images in said recording and second recording member.

4. A business machine in accordance with claim 1 wherein said first member is a record card and said separate images are indicia each supported on separately movable means.

5. A business machine in accordance with claim 4 wherein said separately movable means are manually selectable.

6. A business machine in accordance with claim 5 wherein said first and second recording members are each comprised of an elongated strip of photosensitive paper fed from a roll, said machine including means for developing images in the endmost portion of said strip exposed to images means for severing that portion of the end of said strip having the images of the recording on said card and those generated by said indicia from the rest of the strip, and means for dispensing the severed image bearing portion of said strip from said housing to serve as a receipt or the like.

7. A business machine in accordance with claim 1 wherein said further image producing means includes a plurality of manually settable printing devices operative to print selected images on said recording member.

References Cited

UNITED STATES PATENTS

| | | | |
|---|---|---|---|
| 2,119,713 | 6/1938 | Lang | 101—110 XR |
| 2,508,953 | 5/1950 | Knutsen | 197—1 X |
| 2,547,838 | 4/1951 | Russell. | |
| 2,699,100 | 1/1955 | Simjian | 95—1.1 |
| 2,788,879 | 4/1957 | Rand | 197—1 |
| 2,791,310 | 5/1957 | Jones | 197—1 |
| 2,840,214 | 6/1958 | Doud | 95—1.1 X |
| 2,958,269 | 11/1960 | Simjian | 95—1.1 |
| 3,107,235 | 1/1962 | Sigmond | 95—1.1 X |
| 3,039,582 | 4/1962 | Simjian | 95—1.1 X |
| 3,042,920 | 7/1962 | Simjian | 95—1.1 X |
| 3,111,887 | 11/1963 | Alexander | 95—1.1 |
| 3,267,843 | 8/1966 | Lemelson | 101—59 |

ROBERT E. PULFREY, *Primary Examiner.*

E. S. BURR, *Assistant Examiner.*

U.S. Cl. X.R.

197—1; 101—288, 45